Patented July 14, 1925.

1,545,509

UNITED STATES PATENT OFFICE.

ROBERT J. MONTGOMERY AND MURRAY R. SCOTT, OF ROCHESTER, NEW YORK, ASSIGNORS TO BAUSCH & LOMB OPTICAL COMPANY, OF ROCHESTER, NEW YORK, A CORPORATION OF NEW YORK.

GLASS AND COMPOSITION THEREFOR.

No Drawing.   Application filed April 2, 1923. Serial No. 629,482.

*To all whom it may concern:*

Be it known that we, ROBERT J. MONTGOMERY and MURRAY R. SCOTT, citizens of the United States, and residents of Rochester, in the county of Monroe and State of New York, have invented certain new and useful Improvements in Glass and Composition Therefor; and we do hereby declare the following to be a full, clear, and exact description of the same.

The object of our invention is to provide a glass capable of absorbing as completely as possible, in plates of small thickness, ultra-violet radiations and being at the same time as permeable as possible to the visible radiations and as nearly colorless as possible. Such glass could be used in spectacles to protect the eyes from ultra-violet rays, in globes or shades to surround artificial sources of light, and in windows or light screens.

It is well known that rare earths containing cerium, when added to a glass, decrease the transmission of ultra-violet light but cerium oxide or other cerium compounds produce an undesirable color which becomes quite noticeable and much deeper after exposure to sunlight for a considerable period.

Such a glass may be termed a cerium glass meaning by this one which will have an ultra-violet absorption due to the presence of cerium oxide. A glass carrying the cerium may vary widely in composition without varying the absorptive properties of this material and as the addition of not more than approximately 4.74 per centum of cerium oxide is sufficient to obtain practically complete ultra-violet absorption nothing substantial would be gained by increasing this quantity.

We have discovered that the use of antimony oxide in a glass in conjunction with cerium oxide will give the desired effect of producing a glass which does not transmit ultra-violet light and will still be practically colorless even after exposure to sunlight for considerable periods.

Antimony oxide alone when used in the amounts herein stated will decrease the ultra-violet transmission of a glass and when used in conjunction with cerium oxide, the combination will give a very sharp cut off of ultra-violet light with a piece of glass 2 mm. thick.

Although we have stated approximately 4.74 per centum of cerium oxide as practically the maximum quantity necessary to be used we find that by the addition of the antimony oxide to the composition the amount of cerium oxide may be reduced somewhat and the desired ultra-violet absorption obtained.

While various combinations of ingredients can be used with success, of which examples are given, our preferred batch is No. 1 in the table below, but our invention is not confined to this:—

|        | #1    | #2    | #3    | #4    | #5    |
|--------|-------|-------|-------|-------|-------|
| $SiO_2$ | 70.92 | 71.54 | 68.16 | 69.65 | 71.07 |
| $Na_2O$ | 14.60 | 14.82 | 14.12 | 14.43 | 14.72 |
| $B_2O_3$ | 3.13 | 0.00 | 0.00 | 5.24 | 0.00 |
| $Sb_2O_3$ | 9.46 | 2.38 | 15.90 | 9.29 | 9.47 |
| $CeO_2$ | 1.89 | 1.91 | 1.82 | 1.39 | 4.74 |
| $CaO$ | 0.00 | 9.35 | 0.00 | 0.00 | 0.00 |
|        | 100.00 | 100.00 | 100.00 | 100.00 | 100.00 |

The approximate range is given in batches 2 to 5. The essential point of this invention is the use of cerium oxide in conjunction with antimony oxide preferably in a boro-silicate or soda-lime glass. The percentage of lime may be reduced to zero if it is desired to reduce the index of refraction of the glass. Potassium might be substituted for sodium but we prefer to use the latter. While arsenic may be used in this glass in the usual amounts, better results are obtained without it as the color is better when arsenic is not used. The quantity of $B_2O_3$ may be reduced to zero in some combinations but in others the $B_2O_3$ is quite necessary. In most cases up to 5.25% $B_2O_3$ is high enough to obtain the results desired but we do not limit ourselves to this amount.

We are aware that cerium has been used in a glass for the purpose of cutting off ultra-violet light, but cerium alone gives an undesirable color, especially on exposure to sunlight and even when combined with other oxides the results obtained are not as advantageous as when antimony is employed.

We find that good results are obtained by the use of cerium oxide not exceeding approximately 4.74 per centum and antimony oxide not exceeding sixteen per centum of the compositions stated as examples herein, the general relations of the ingredients being also given. Our invention being based upon the discovery that the addition of antimony oxide to a cerium glass composition prevents the discoloration of the glass by sunlight, and we have given several examples of practical ways of carrying out the invention in which the percentages of the various ingredients are varied we do not desire to be confined to exact proportions.

As it is difficult to determine by analysis the exact proportion of cerium and antimony contained in the glass the invention comprehends the process of making it.

We claim as our invention:

1. A glass composition comprising cerium oxide in sufficient quantity to cause ultra-violet absorption and antimony oxide in quantity sufficient to prevent the coloring of the glass by exposure to sunlight.

2. A glass composition comprising cerium oxide up to approximately 4.74 per centum and antimony oxide up to approximately sixteen per centum substantially as described.

3. A cerium glass composition containing up to approximately sixteen per centum of antimony oxide.

4. In the manufacture of a cerium glass composition such as described, the addition of a quantity of antimony oxide equal to from two per centum to sixteen per centum of the mixture.

5. A mixture of ingredients for making glass comprising silicon and sodium oxides and boron oxide for controlling the melting behavior and optical properties of the glass, and in addition thereto cerium oxide in sufficient quantity to cause ultra-violet absorption and antimony oxide up to approximately sixteen per centum.

6. A mixture of ingredients for making glass comprising silicon and sodium oxides and calcium oxide for controlling the melting behavior and optical properties of the glass, and in addition thereto cerium oxide in sufficient quantity to cause ultra-violet absorption and antimony oxide up to approximately sixteen per centum.

7. A mixture of ingredients for making glass comprising the following materials in substantially the following proportions: Silicon oxide from 68 to 72 per centum, sodium oxide from 14 to 15 per centum, cerium oxide from 1 to 4.74 per centum, antimony oxide not exceeding sixteen per centum, together with boron oxide up to 5.25 per centum.

8. The method of rendering cerium glass or glass containing cerium oxide unchangeable by the action of sunlight, consisting in adding to the glass composition antimony oxide in sufficient quantity to accomplish this result without materially modifying its other characteristics.

ROBERT J. MONTGOMERY.
MURRAY R. SCOTT.